United States Patent
Lam et al.

(10) Patent No.: US 8,151,243 B1
(45) Date of Patent: Apr. 3, 2012

(54) SYSTEM AND METHOD FOR DETERMINING WHETHER AN ARRAY IS A READ-ONLY ARRAY

(75) Inventors: Ioi K. Lam, Mountain View, CA (US); Oleg A. Pliss, Santa Clara, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1201 days.

(21) Appl. No.: 11/448,320

(22) Filed: Jun. 6, 2006

(51) Int. Cl.
*G06F 9/44* (2006.01)
(52) U.S. Cl. ......... 717/106; 717/107; 717/108; 717/109
(58) Field of Classification Search .................. 717/106, 717/107, 108, 109
See application file for complete search history.

(56) References Cited

U.S. PATENT DOCUMENTS

| 5,303,380 A * | 4/1994 | Tenny et al. .................. 717/162 |
| 6,526,571 B1 * | 2/2003 | Aizikowitz et al. ........... 717/154 |
| 2005/0198625 A1 * | 9/2005 | Shi et al. ....................... 717/153 |
| 2007/0061345 A1 * | 3/2007 | Thompson et al. ........... 707/100 |

OTHER PUBLICATIONS

Park, et al. "Reference Escape Analysis: Optimizing Reference Counting based on the Lifetime of References", 1991, ACM, p. 178-189.*

* cited by examiner

*Primary Examiner* — Qamrun Nahar
(74) *Attorney, Agent, or Firm* — Park, Vaughan, Fleming & Dowler LLP; Mark Spiller

(57) ABSTRACT

One embodiment of the present invention provides a system that determines whether a data structure, such as an array, is modifiable. First, the system loads a source file for a class. The system then examines the source file to identify a set of data structures in the class, and uses escape analysis to determine whether each data structure is modifiable. The system then performs an action based on the determination. In a variation on this embodiment, if the data structure is not determined to be modifiable, performing the action involves storing the data structure in a read-only memory (ROM) instead of a random-access memory (RAM), which leaves more RAM available for other purposes.

17 Claims, 3 Drawing Sheets

SOURCE CODE 200

```
class LocaleData {
    static final int i = 4;
    private static final char A[] = {
        'a', 'b', 'x', 'y', ....};
    public static char B[] = {'z','q'};
    public static char getChar(int k) {
        return A[k];
    }
}
```

PSEUDOCODE 202

```
i = 4;
New array A[];
New array B[];
A[0] = 'a';
A[1] = 'b';
A[2] = 'x';
⋮
```

SYSTEM AND METHOD FOR DETERMINING WHETHER AN ARRAY IS A READ-ONLY ARRAY

BACKGROUND

1. Field of the Invention

The present invention relates to determining access patterns for software variables. More specifically, the present invention relates to a system and a method for determining whether an array is a read-only array.

2. Related Art

The Java 2 Platform, Micro Edition (J2ME™), has become a very popular software platform for memory-constrained devices, such as wireless devices. Motorola, Nokia, NTT DoCoMo, RIM, Siemens, and many other key players in the wireless device industry have shipped a large number of J2ME-enabled devices. In fact, hundreds of millions of J2ME-enabled mobile phones have been shipped during the past few years.

Many J2ME™ devices are extremely resource-constrained, with only a limited amount of random-access memory (RAM) available for the operating system and applications. Whenever possible, read-only system classes for the device are typically loaded into a less-constrained read-only memory (ROM) instead of RAM, thereby conserving space in RAM. However, because the Java™ language does not support read-only data types, programmers cannot specify within code that a structure such as an array should be read-only. As a result, such arrays are often stored in RAM, even if they are never modified.

Hence, what is needed is a method and a system for determining whether an array is a read-only array.

SUMMARY

One embodiment of the present invention provides a system that determines whether an array is modifiable. First, the system loads a source file for a class. The system then examines the source file to identify a set of arrays in the class, and uses escape analysis to determine whether each array is modifiable. The system then performs an action based on the determination.

In a variation on this embodiment, if the array is not determined to be modifiable, performing the action based on the determination involves storing the array in a read-only memory (ROM) instead of a random-access memory (RAM), which leaves more RAM available for other purposes.

In a variation on this embodiment, the source file is a Java™ class file. Note that the Java™ language does not allow users to specify read-only arrays.

In a further variation, the system uses these techniques on Java™ system classes before generating a ROM.

In a further variation, escape analysis involves determining whether one or more of the following conditions exists:
  a class method modifies the array;
  the array is declared to be public, and thus can potentially be modified by other classes;
  the array is declared to be protected, and thus can potentially be modified by subclasses;
  the array is passed to another class or a native method; and/or
  the class is visible to another class in the system.

In a further variation, a Java™ implementation makes the class invisible to other classes in order to prevent other classes from modifying the array.

In a further variation, the system checks a second class that the array has been passed to in order to ensure that the second class does not modify the array.

In a variation on this embodiment, the set of arrays includes localization data for different languages and other regional settings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Determining Read-Only Arrays

Figures 1, 2:
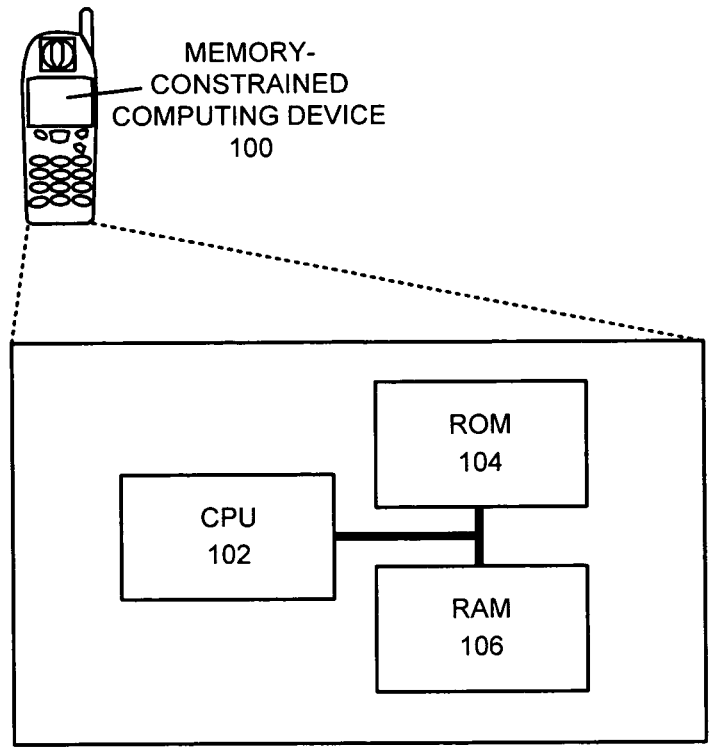
FIG. 1 illustrates a memory-constrained computing device that includes a ROM and a RAM in accordance with an embodiment of the present invention.
FIG. 2 illustrates the source code and pseudocode for a class in accordance with an embodiment of the present invention.

FIG. 1 illustrates a memory-constrained computing device 100 with a CPU 102, ROM 104, and RAM 106. In embedded systems, RAM space is typically limited, while ROM space is generally cheaper and more abundant. Therefore, if the system can detect that a certain array will not be modified in the future, the system can place the array inside the ROM 104, thereby freeing valuable RAM 106 space. Note that in some systems, whenever a program reads an element in an array, the system issues an explicit memory-load instruction to read the latest value stored inside the array. If the system can determine that an array will never be written to, the system can cache recently-loaded elements in CPU registers, thereby avoiding expensive memory-loading operations. Note that many programming languages, such as Java™, do not support read-only arrays.

FIG. 2 illustrates a section of source code 200 that declares two arrays, as well an example of pseudocode 202 that might be generated for the source code 200. The sample source code 200 in FIG. 2 declares a static final int i as well as two character arrays, private static final char A[ ] and private static char B[ ]. While the system can easily determine the non-writable nature of the int based on the final keyword, and can place the variable in the ROM 104, such non-array variables are typically small, and do not consume much space. The declaration of array A[ ] as final, however, only indicates that the memory pointer to the array does not change. This declaration does not indicate that the data at the corresponding memory location does not change. Hence, the contents of both A[1] and B[1] can potentially be modified at runtime. As a result, the system typically places such arrays in RAM 106.

The present invention uses "escape analysis" to determine if an array can be modified in the future. While providing a general solution to this problem involves substantial complexity, a system that can detect even a subset of read-only arrays can provide significant benefits for embedded systems.

Using Escape Analysis to Detect Read-Only Arrays

In one embodiment of the present invention, the system uses escape analysis during the "romization" process to determine whether an array in a system class can be modified. System classes are typically the set of classes always available in a device. During the build process, system classes are built into a package on a development host and installed into the device along with a virtual machine (VM). As part of the build process, the system loads all system classes from their class files and then adjusts them in such a way that, when the VM is executed on the device, from the viewpoint of the VM these classes have already been loaded and initialized. The output of the build process is known as a "romized java class library," and is stored in the ROM 104. Organizing the ROM 104 in this way at build time avoids the need at runtime to read system classes into memory and load them into the context of the VM.

Part of the romization process involves creating data structures for the system classes to determine the portions of each class that are read-only, so that the system can place them in the ROM 104 of the device. One embodiment of the present invention extends this process by analyzing static fields to determine if any are never modified at runtime.

Figure 3:
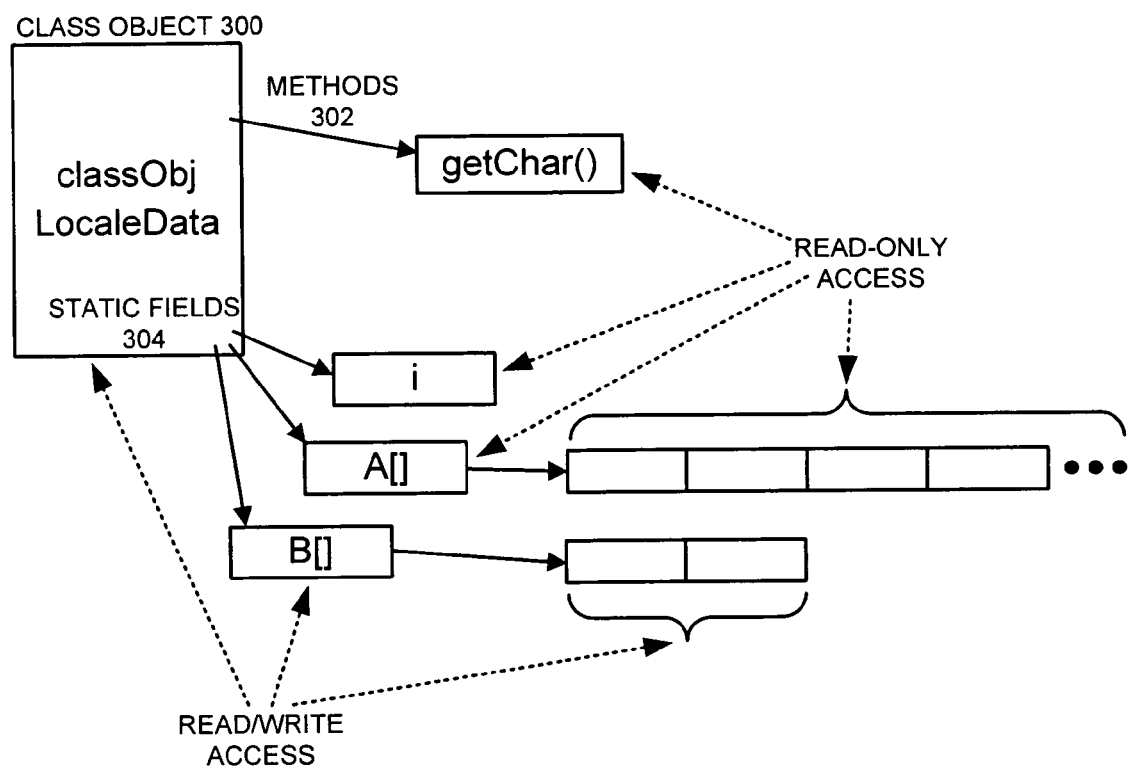
FIG. 3 illustrates a set of data structures for a class object in accordance with an embodiment of the present invention.

FIG. 3 illustrates a set of data structures for the class object 300 defined in the source code 200. These data structures are used when determining whether a program writes into a certain array.

Figure 4:
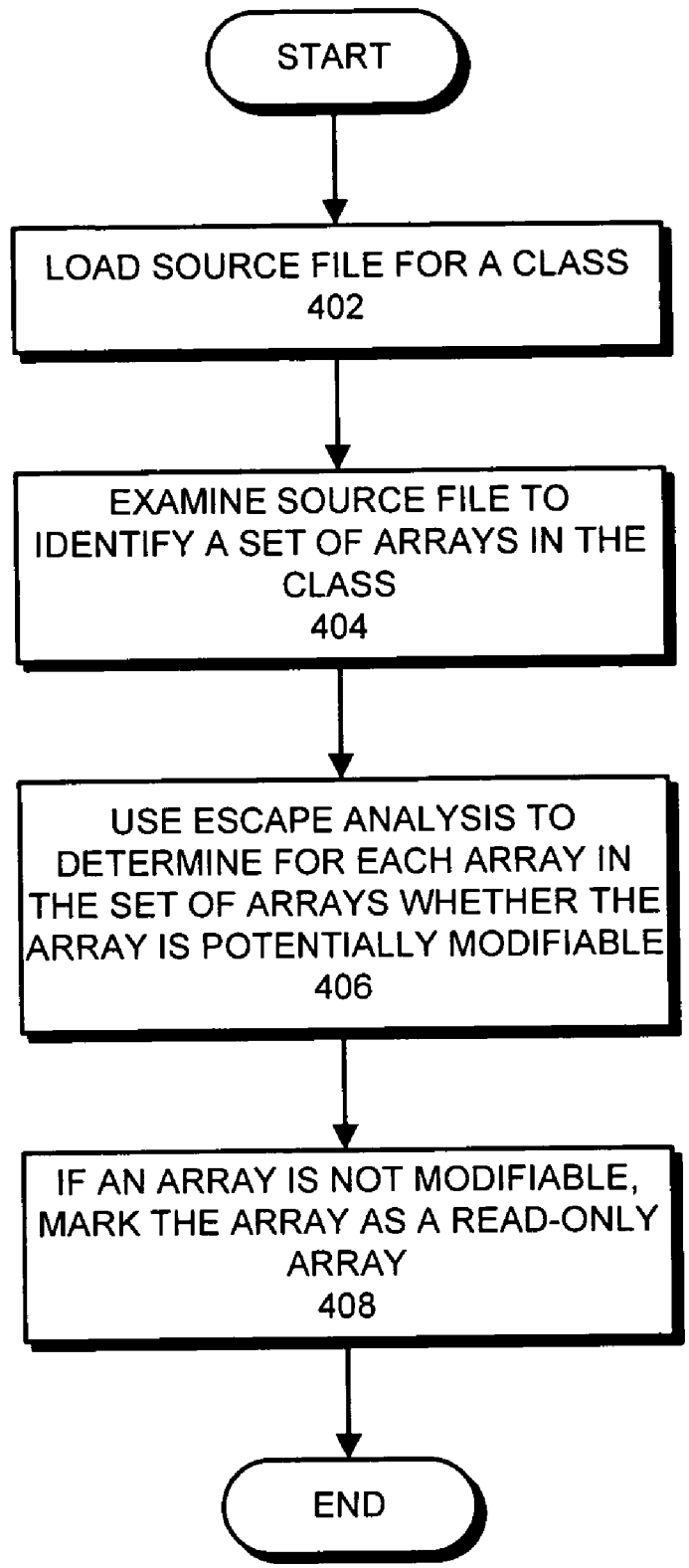
FIG. 4 presents a flow chart illustrating the process of detecting read-only arrays in a class file in accordance with an embodiment of the present invention.

FIG. 4 presents a flow chart that illustrates the process of detecting read-only arrays in a class file. First the system loads a source file for a class (step 402). Next, the system examines the source file to identify a set of arrays in the class (step 404). Then, the system uses escape analysis to determine for each array in the set of arrays whether the array is modifiable (step 406). Typically, the system begins by marking all objects with default types, and then changes the markings for objects appropriately depending upon further analysis. For instance, the system determines that the class methods 302, static final int i, and the pointer for array A[ ] in FIG. 3 are read-only. On the other hand, some of the other static fields 304 and the actual arrays are initially marked to indicate read/write access. In this example, because the class object 300 includes non-final static fields that may be changed, the class object 300 is also marked for read/write access.

Performing escape analysis for arrays involves determining whether an array is ever modified at runtime, and, if not, changing the attribute for the array from read/write access to read-only. Escape analysis includes, but is not limited to, determining whether one or more of the following conditions exists:

a class method modifies the array;
the array is declared to be public, and thus can potentially be modified by other classes;
the array is declared to be protected, and thus can potentially be modified by subclasses;
the array is passed to other classes or a native method; and/or
the class is visible to another class in the system.

For the source code 200 in FIG. 2, the system first confirms that no class method modifies A[ ]. While this is true in this example, this check is insufficient to guarantee read-only status, since A[ ] may "escape" the class, for instance by being writable to an external class or sub-class if declared as public or protected. Even if A[ ] is private to the specific class, the array might still be passed as an object to a method in another class or a native method, and be modified there. In one embodiment of the present invention, multiple classes may be analyzed to determine whether an array passed to another class is modified in that class. While this technique allows system classes identified at build time to be checked, some classes may be sub-classed by user classes installed after romization. As a result, some implementations allow classes, especially system classes, to be specified as "invisible" with respect to sub-classing during romization, to prevent later writes that violate identified read-only status. In this case, the system only needs to ensure that system classes do not modify a given array.

By confirming that all of the above checks are correct, the system confirms that the contents of the array are not modifiable and will not change during future execution, and the array is marked as a read-only array 408. In the worst case, if the system cannot determine with certainty that an array is read-only, the array is left marked for read/write access, and placed in the RAM 106. For the example in FIG. 3, the system determines that the array A[ ] is read-only, while the public array B[ ] may need read/write access.

This technique can provide significant benefits for large localization tables, for instance containing character data for different languages. These tables are initialized at romization time, and typically never modified. For Asian languages, localization data can range from tens to hundreds of kilobytes, and placing these arrays in a ROM can result in significant RAM savings for devices that may have only 1-2 megabytes of RAM.

In summary, detecting read-only arrays allows data to be stored in a ROM instead of a RAM. The present invention detects read-only arrays using escape analysis, thereby saving valuable RAM space for other uses. Note that this technique is not limited to arrays, but can also be applied generally to all types of data structures, including but not limited to objects and class objects.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for determining whether an array is read-only, comprising:
    loading a source file for a class;
    examining the source file to identify a set of arrays in the class;
    using escape analysis to determine that a at least one array in the set of arrays is read-only, wherein escape analysis comprises, when an array is passed to one or more other classes, analyzing the one or more other classes to determine when the array is modified in the one or more other classes, and determining when a class method modifies the array; and
    storing data associated with the read-only array in a read-only memory (ROM).

2. The method of claim 1, wherein the source file comprises program code in a programming language that does not allow users to specify read-only arrays.

3. The method of claim 2, wherein the method further comprises:
   after storing the data associated with the read-only array, generating a ROM.

4. The method of claim 1, wherein using escape analysis comprises determining whether one or more of the following conditions exists:
   the array is declared to be public, and thus can potentially be modified by other classes;
   the array is declared to be protected, and thus can potentially be modified by subclasses;
   the array is passed to a native method; and
   the class is visible to another class in the system.

5. The method of claim 4, wherein the method further comprises:
   making the class invisible to other classes in order to prevent other classes from modifying the data associated with the read-only array.

6. The method of claim 1, wherein the set of arrays includes localization data for different languages and other regional settings.

7. The method of claim 1, further comprising initially marking an attribute for the array to indicate read/write access,
   wherein using escape analysis to determine that the array is read-only comprises, upon determining that the array is read-only, changing the attribute from read/write access to read-only.

8. The method of claim 1, further comprising, upon determining that the array is read-only, caching recently-loaded elements for the array in one or more CPU registers.

9. A computer-readable storage medium storing instructions that when executed by a computer cause the computer to perform a method for determining whether an array is read-only, the method comprising:
   loading a source file for a class;
   examining the source file to identify a set of arrays in the class;
   using escape analysis to determine that a at least one array in the set of arrays is read-only, wherein escape analysis comprises, when an array is passed to one or more other classes, analyzing the one or more other classes to determine when the array is modified in the one or more other classes, and determining when a class method modifies the array; and
   storing data associated with the read-only array in a read-only memory (ROM).

10. The computer-readable storage medium of claim 9, wherein the source file comprises program code in a programming language that does not allow users to specify read-only arrays.

11. The computer-readable storage medium of claim 10, wherein the method further comprises:
    after storing the data associated with the read-only array, generating a ROM.

12. The computer-readable storage medium of claim 9, wherein using escape analysis comprises determining whether one or more of the following conditions exists:
    the array is declared to be public, and thus can potentially be modified by other classes;
    the array is declared to be protected, and thus can potentially be modified by subclasses;
    the array is passed to a native method; and
    the class is visible to another class in the system.

13. The computer-readable storage medium of claim 12, wherein the method further comprises:
    making the class invisible to other classes in order to prevent other classes from modifying the data associated with the read-only array.

14. The computer-readable storage medium of claim 9, wherein the set of arrays includes localization data for different languages and other regional settings.

15. A computer system that determines whether an array is read-only, comprising:
    a processor; and
    a memory;
    wherein the computer system is configured to,
        load a source file for a class,
        examine the source file to identify a set of arrays in the class,
        use escape analysis to determine that a at least one array in the set of arrays is read-only, wherein escape analysis comprises, when an array is passed to one or more other classes, analyzing the one or more other classes to determine when the array is modified in the one or more other classes, and determining when a class method modifies the array, and
    store data associated with the read-only array in a read-only memory (ROM).

16. The computer system of claim 15, wherein the source file comprises program code in a programming language that does not allow users to specify read-only arrays.

17. The computer system of claim 16, wherein using escape analysis comprises determining whether one or more of the following conditions exists:
    the array is declared to be public, and thus can potentially be modified by other classes;
    the array is declared to be protected, and thus can potentially be modified by subclasses;
    the array is passed to a native method; and
    the class is visible to another class in the system.

* * * * *